Aug. 14, 1951  A. A. G. MAGIS  2,564,165
APPARATUS FOR COOLING PRODUCTS IN CONTAINERS
Filed Dec. 26, 1947
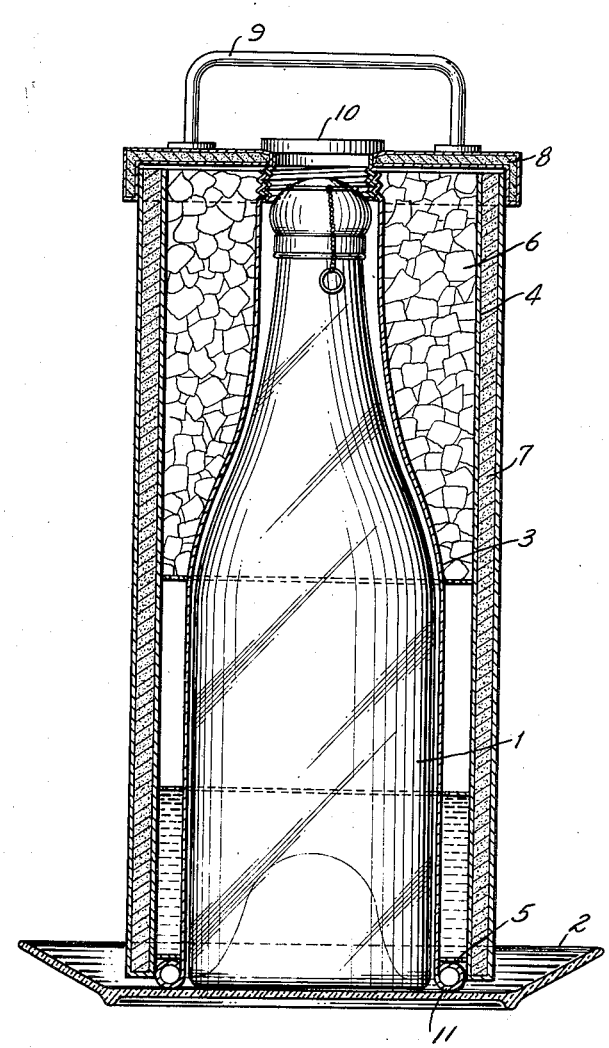
Inventor:
AUGUSTE ADELIN GUSTAVE MAGIS
BY  Attorneys Patented Aug. 14, 1951

2,564,165

UNITED STATES PATENT OFFICE 2,564,165

APPARATUS FOR COOLING PRODUCTS IN CONTAINERS

Auguste Adelin Gustave Magis, Paris, France

Application December 26, 1947, Serial No. 793,953
In France January 15, 1943

Section 1, Public Law 690, August 8, 1946
Patent expires January 15, 1963

1 Claim. (Cl. 62—143)

This invention relates to apparatus for cooling products in containers and particularly wines in bottles.

White wines are preferably drunk rather cool and it is also customary to ice them by immersing the bottles in pails filled with crushed ice or, more often, by pieces of ice melting in water drawn from the ordinary water mains or from wells.

This method does not possess the virtues which it is desired to attribute to it. The phenomenon of the fusion of the ice is very badly utilized with the result that the cost of icing a bottle is pretty high. Moreover, it is untidy since it means handling a bottle which is wet all over, while the pail, filled with substances at a low temperature and not being insulated, becomes covered with condensed moisture which quickly wets everything round about it to the great annoyance of the mistress of the house or the hotel keeper responsible for the high standard of the service.

Finally, unless a very long time is allowed to elapse the wine served first is still lukewarm because the cooling has commenced from the bottom of the bottle, no circulation having been able to take place in it.

The object of the present invention is therefore to provide an apparatus for cooling fluids in bottles in which the cooling of the liquid to be cooled begins at the top of the vessel. There is thus produced in the liquid, from the beginning, a circulation which compels the lighter, and therefore warmer, liquid to come into contact with the upper part of the apparatus, where precisely the greatest quantity of ice or other refrigerating agent is concentrated.

The apparatus which constitutes the subject matter of the present invention comprises broadly a vessel or jacket with double walls designed to receive ice and the inner wall of which fits as closely as possible to the contour of the body to be cooled, the outer wall being cylindrical or widened towards the top, according to the quantity of ice necessary to obtain the result sought. Preferably, this outer wall is itself perfectly heat insulated so that only the heat contained in the vessel and in the liquid to be cooled passes into the refrigerant.

The water formed by the melting of the refrigerant collects in the space limited by the two walls thus augmenting the efficacy of the heat insulation.

At the bottom the apparatus may comprise a groove designed to receive rubber, felt, cardboard or any other material capable of making a tight joint with the support on which the vessel to be cooled stands.

In this way, the bottle and its contents will always remain immersed in air at the lowest temperature possible.

A cover, likewise heat insulated, may complete the insulation of the refrigerant from every external source of heat. A handle attached to the cover or to the body itself of the apparatus facilitates the handling of it which is very simple since it consists merely in lifting it off the vessel, placing it alongside it, pouring out the contents thereof as usual and then recovering it with the apparatus.

The bottle remains perfectly dry and cold and all condensation on the apparatus is avoided by its heat insulation.

This apparatus, by means of suitable changes in shape, may be put to numerous uses, inter alia in biological laboratories, where the withdrawal from and return to refrigerators of cultures or solutions requiring periodical and frequent observation within narrow limits of temperature constitute not only an appreciable loss of time but also involve the disk of errors and accidents. With the apparatus which forms the subject matter of the present invention all operations are limited to the lifting of an object off and replacing it on the liquid under observation without even touching this latter.

The best possible transmission of heat is obtained when the inner surface which faces the recipient directly is painted a dull black.

The description about to be given, reference being had to the accompanying drawing, given by way of non-limitative example, will enable the way in which the invention is put into practice to be clearly understood, the essential features shown in the drawing and described in the text, forming, it must be understood, part thereof.

The single figure shows in axial section the apparatus in the form which is preferably the one adopted, i. e. in the case in which it is used to cool wine.

In this figure the bottle 1 which is to be cooled is placed on a dish or tray 2. The inner wall 3 of the jacket of the apparatus fits the shape of the bottle and the outer wall 4 defines with the base 5 and the wall 3 the space intended to receive the refrigerating agent 6 represented in the drawing by pieces of ice. The outer wall 4 is completely covered with a heat insulating material 7 which may itself be protected by any other covering of suitable material or serve simply for ornament. A cover 8, provided with a handle 9, may be fixed by any well known means to the inner wall or to the outer one, or to the covering constituting the insulation. The drawing shows a screw thread cut in the inner wall and into which a closed cap 10 integral with the cover screws. In order to fill the jacket with refrigerant cap 10 and cover 8 are unscrewed from the internal thread at the top of inner wall 3, thus giving access to the space between walls 3 and 4. There may also be added (particularly in cases where the space comprised between the two walls is not very narrow, at the lower part), as shown in the drawing a perforated plate, a grid or the like, which keeps the ice in position in the upper part and allows the water formed by the melting of the ice to pass through it. The base 5, slightly above the end of the jacket, has a groove into which a packing ring 11 forming an airtight joint is sprung.

It is obvious that modifications of shape may be made in the apparatus without thereby departing from the scope of the invention.

I claim:

A cooler for a wine bottle or the like embodying a bottle-enveloping refrigerant jacket defined by outer and inner walls; said inner wall being generally of bottle-conforming shape, said outer wall being insulated and generally of cylindrical shape, said jacket having a greater refrigerant-containing capacity at its upper portions than at its lower portions whereby a small piece of ice will fall to a lower level within the jacket than a larger piece of ice, said cooler including a packing ring adapted to form a heat barrier around its bottom-most portion and a removable insulated cover across its top-most portion sealing said jacket, and said cover having a central cap removable therewith to give access to the interior refrigerant-containing region within the cooler.

AUGUSTE ADELIN GUSTAVE MAGIS.

REFERENCES CITED

The following references are of record in the file of this patent:

UNITED STATES PATENTS

| Number | Name | Date |
|---|---|---|
| 93,001 | Pietsch | July 27, 1869 |
| 409,292 | Levy | Aug. 20, 1889 |
| 905,439 | Kruger | Dec. 1, 1908 |
| 1,999,670 | Strouse et al. | Apr. 30, 1935 |

FOREIGN PATENTS

| Number | Country | Date |
|---|---|---|
| 196,914 | Germany | Mar. 31, 1908 |
| 210,196 | Germany | May 22, 1909 |